United States Patent [19]
Minghetti et al.

[11] Patent Number: 5,530,041
[45] Date of Patent: Jun. 25, 1996

[54] PROCESS OF MAKING ACRYLIC-FILLED THERMOFORMABLE ACRYLIC SHEET

[75] Inventors: Ettore Minghetti; John E. Eitel, both of Boone County, Ky.

[73] Assignee: Aristech Chemical Corporation, Pittsburgh, Pa.

[21] Appl. No.: 373,686

[22] Filed: Jan. 17, 1995

Related U.S. Application Data

[62] Division of Ser. No. 98,564, Jul. 26, 1993, Pat. No. 5,415,931, which is a continuation of Ser. No. 948,272, Sep. 16, 1992, abandoned, which is a division of Ser. No. 572,831, Aug. 27, 1990, Pat. No. 5,242,968.

[51] Int. Cl.$^6$ ............................. C08K 5/00; B32B 5/12
[52] U.S. Cl. ............................. 524/81; 428/327; 428/407; 428/520; 524/430; 524/437; 524/533; 525/228; 525/309
[58] Field of Search ...................... 428/327, 407, 428/520, 15, 522; 524/430, 533, 437, 81, 425, 449; 525/228, 309

[56] References Cited

U.S. PATENT DOCUMENTS

| | | | |
|---|---|---|---|
| 3,050,785 | 8/1962 | Cunningham | 18/59 |
| 3,371,383 | 3/1968 | Hellsund | 18/26 |
| 3,376,371 | 4/1968 | Opel et al. | 264/216 |
| 3,661,994 | 5/1972 | Hwa et al. | 260/879 |
| 3,793,402 | 2/1974 | Owens | 260/876 R |
| 3,847,865 | 11/1974 | Duggins | 260/42.52 |
| 3,985,703 | 10/1976 | Ferry et al. | 260/42.29 |
| 4,048,257 | 9/1977 | Stevenson | 260/862 |
| 4,085,246 | 4/1978 | Buser et al. | 428/220 |
| 4,159,301 | 6/1979 | Buser et al. | 264/331 |
| 4,282,140 | 8/1981 | Bousquet et al. | 260/42.52 |
| 4,287,317 | 9/1981 | Kitagawa et al. | 525/309 |
| 4,433,070 | 2/1987 | Ross et al. | 523/171 |

*Primary Examiner*—D. S. Nakarani
*Assistant Examiner*—H. Thi Le
*Attorney, Agent, or Firm*—William L. Krayer; Robert R. Gavlik

[57] ABSTRACT

A monomer-rich acrylic syrup is cast including about 10% to about 20% ground acrylic particles. During curing, the particles absorb over half their weight in monomer, and a cured sheet is formed in which the matrix monomer and uncrosslinked polymer form a phase which extends through the particles, while the particles appear to be fused together. Including a crosslinker in the syrup further insures the interpenetration of the matrix phase into the swollen particles. A textured surface is formed, which is useful as an anti-slip surface in bathtubs and shower stalls, after thermoforming.

8 Claims, No Drawings

PROCESS OF MAKING ACRYLIC-FILLED THERMOFORMABLE ACRYLIC SHEET

This is a division of application Ser. No. 098,564 filed Jul. 26, 1993, now U.S. Pat. No. 5,415,931, which is a continuation of application Ser. No. 948,272, filed Sep. 16, 1992, now abandoned, which is a division of our patent application Ser. No. 572,831, filed Aug. 27, 1990, now U.S. Pat. No. 5,242,968.

TECHNICAL FIELD

This invention relates to a new type of thermoformable acrylic sheet and a method of making it. In particular, it relates to a thermoformable acrylic composition made from a syrup of polymerized acrylic esters dissolved in monomers predominantly comprising methyl methacrylate. Added to this syrup is about 10% to about 20% ground acrylic which may also be primarily polymethylmethacrylate.

BACKGROUND OF THE INVENTION

It is known that if pure methyl methacrylate is polymerized, the volume it occupies will shrink typically by about 20% to about 22%. There are also exothermic effects and acceleration in the rate of polymerization which make the reaction difficult to control. Accordingly, it has become common commercially to prepolymerize a portion of the monomer and prepare a solution of such prepolymerized methylmethacrylate in additional monomer so the casting, or final polymerizing, process can be more readily controlled and its ultimate size and shape anticipated. An example of a manner of use of such a syrup is illustrated in Hellsund's U.S Pat. No. 3,371,383 and Opel et al U.S. Pat. No. 3,376,371, which describe the continuous casting of wide sheets of acrylic between two stainless steel belts appropriately moved and temperature-controlled while they are spaced apart with the polymerizing material contained between them. Such casting, and stationary or cell casting, has been performed with minor amounts of other monomers in the methyl methacrylate, such as ethyl or butyl acrylate, diunsaturated cross-linking agents, and the like.

Various organic and inorganic additives or fillers are and have been used in resinous articles for decorative, strength, fire-retardant, economic and other reasons. Pigments may be added for color, glass fibers for strength, aluminum trihydrate for fire retarding, and any inexpensive space-occupier for economic reasons. Ground polyester resin was added by Ross and Stevens to a polyester matrix (see Reexamination Certificate 634th B14,433,070). However, the particulate resin apparently remained at the same hardness throughout, without absorbing any of the matrix resin. Ground acrylic resin is used in a "molding mix" in Cunningham's U.S. Pat. No. 3,050,785 in a polymethylmethacrylate matrix of a particular type of tacticity; no instructions are given as to the preferred method of use and nothing is said as to the ability of the particular kind of PMMA to absorb the PMMA of the matrix. Acrylates of certain glycols are employed in Cohen et al U.S. Pat. No. 4,414,278; they are used because they are not swellable, however, contrary to the present applicants' objectives. Stevenson's U.S. Pat. No. 4,048,257 describes the use of lightly cross-linked polyester beads as components of thermosetting molding materials; certain methylmethacrylate mixtures are also described and a method of measuring swellability is given.

It may also be considered relevant to the background of this invention that impact resistance has been imparted to polymethylmethacrylate sheet and other products by incorporating into the acrylic sheet an effective amount of an impact modifier additive which is in the form of small beads or particles made of acrylic esters but also including butyl acrylate or other higher acrylate to form a rubbery component in the particle. See, for example, Hwa et al U.S. Pat. No. 3,661,994 and Ferry et al U.S. Pat. No. 3,985,703. Such special rubbery acrylic particles are typically made in aqueous suspension specially for imparting impact resistance and are not known for their ability to swell by incorporation of the matrix solvent monomer as in the present invention.

SUMMARY OF THE INVENTION

The present invention is a thermoformable sheet made of an essentially polymethylmethacrylate ("PMMA") matrix having dispersed therein about 5% to about 25% by weight ground PMMA. The ground PMMA, clear or pigmented, is preferably predominantly from about 0.2 mm to about 0.5 mm in its short dimension and may be of several different colors. The matrix is made from a syrup which is rich in methyl methacrylate compared to conventional casting syrups, and it may be clear or colored by means of dyes and/or non-soluble pigments as is known in the art. The ground PMMA will absorb over 100% of its weight during the process of the invention prior to polymerization of the matrix syrup, thus causing a pronounced blurring of the phases in that the matrix polymerizes through the boundaries of the ground particles. In the process of absorbing the syrup, the particles will expand to over 200% of their original volume; most of the material which is absorbed from the syrup is monomeric methyl methacrylate, although it is believed that some cross-linking agent will be absorbed also and possibly some portions of uncrosslinked polymer present in the syrup. In any event, upon curing the PMMA extends throughout the finished material including the interior of the particles, making them mechanically inseparable from the matrix and thus no longer of a separate phase. The product has a high gloss, mirror-like surface finish in the flat sheet form. If the sheet is heated, a distinct textured appearance and feel develops. The textured appearance and feel persist and increase slightly after thermoforming, particularly in areas of relatively deep draw, which overcomes the tendency of the acrylic otherwise to be slippery.

The combination of size and amount of ground acrylic particles which we employ achieves a balance of properties necessary or advantageous to the expedient manufacture of the product. The manufacture of the product is a relatively dynamic process in that the particles tend to begin absorbing monomer immediately on contact with the syrup and will continue to do so at room temperature over a period of time, as will be seen below. On the other hand, the particles tend to settle at first and must be kept suspended. Because of their soaking up monomer, the composition of the syrup is under constant change during the preparation of the cure mixture, and accordingly it is important to use the correct amount of monomer. When the filler or ground particulate increases in size from, say 15 cc to 35 cc in a container of 100 cc, the volume of syrup has decreased from 85 cc to 65 cc; moreover the composition of the syrup has changed from a relatively thin solution of polymer in methyl methacrylate to a relatively thick medium of polymer. The syrup or suspending medium together with the ground PMMA becomes thixotropic and advantageously does not permit the swollen particles to settle, thus achieving an even distribution.

Since our process employs at least 5% particles, and the particles swell to at least double their original volume, it may be said that the swollen particles comprise at least about 10% by volume of the finished product, excluding inert fillers.

At room temperature, the syrup containing the particles is stirred or agitated for a period of about 45 minutes to about 180 minutes in order to assure a substantial completion of swelling before casting. At higher temperatures, the swelling process can be completed in shorter times. The syrup containing the swollen particles is then placed more or less in the conventional manner into a mold or, in a preferred process, between two moving stainless steel belts as described in the above-mentioned Hellsund and Opel patents for a controlled cure as is known in the art. After curing, the product may be removed from the stationary mold or cut from the sheet emerging from the belts in the known manner.

On thermoforming the sheets, a rough surface is observed which nevertheless does not lose the glossy superficial appearance of an acrylic ester.

DETAILED DESCRIPTION OF THE INVENTION

Acrylic particles of a relatively wide description may be used in our invention. However, they should be made of primarily methyl methacrylate, i.e. the polymerizable portion of the ingredients should be at least about 90% weight methyl methacrylate, and should contain up to about 1.0% cross-linking agent. Fillers and pigments may be present in the ground particles as well as, or instead of, in the matrix.

While inorganic pigments are typically quite small in size and are seldom more than a minor component in volume, other relatively inert inorganic ingredients may be used as fillers in our composition apart from the various percentages (or parts by weight) stated herein. For example, such fillers as alumina trihydrate may be added in amounts as high as all the other ingredients combined, or more, to impart desirable flame resistance; other inert inorganic fillers may also be used such as calcium carbonate, mica, and sand or ground silica. If alumina trihydrate is used, it may be used in any amount which can be handled—for example, in amounts from about 10% to about 55% by weight of the finished product may be alumina trihydrate having a particle size of about 20–200 microns.

We prefer to use particles of a composition comprising about 20% linear PMMA, not crosslinked, about 80% crosslinked copolymer PMMA-BA (97 to 3 ratio of methyl methacrylate to butyl acrylate), and 0–3% dyes or pigments.

While the particles can be beads specially made in aqueous suspension for use in the present invention and, therefore, can have a controlled size, we prefer to use ground particles made from previously cured products. For example, the ground particles can be made from crushed scrap in an acrylic sheet manufacturing facility. The scrap or other preformed acrylic product is first crushed and then ground or impacted to make particle sizes predominantly from about 0.1 mm to about 2.0 mm in their shortest dimensions, preferably having a range of 0.2 mm to 0.5 mm. To make a product having the appearance of granite, no more than about 1% of the particles should have a short dimension of greater than about 0.5 mm (that is, no more than about 1% should be retained on a sieve having openings of 0.5 mm).

The syrup should be rich in methyl methacrylate monomer. Normally, a casting syrup for clear or colored sheet products will contain about 8% to about 25% (the percentages exclude fillers) PMMA having a weight average molecular weight of about 150,000 to about 600,000. We have found that such a typical syrup of the prior art may not be appropriate for the present invention because the ground acrylic absorbs well in excess of its own weight in monomer. Accordingly, the syrup should include somewhat more monomer, i.e. 5 to 20% of PMMA polymer dissolved in 80 to 95% monomers, depending generally, within the discretion of the artisan, on how much ground acrylic is used, and its capacity to absorb monomer.

By "PMMA polymer" is meant substantially uncrosslinked polymer of methyl methacrylate having a weight average molecular weight of about 200,000 and having optionally small amounts (up to 10%) of other monomers therein, such as a lower alkyl acrylate, i.e. ethyl or butyl acrylate. In addition, 0.05 to 0.2% of peroxide initiators should be included; pigments and fillers may also be employed within the discretion of the manufacturer.

When the particles are first placed in a graduated cylinder and the syrup added, in a ratio of 15/85 by weight, the increase in volume of the particles can be roughly gauged by observing the level of the particles in the cylinder, after initial agitation to avoid packing of the swelling particles, as in the table below (expressing the level as a percent of the overall level).

|         | 70° F. | 180° F. |
| --- | --- | --- |
| Initial | 28 | 28 |
| 15 min  | 46 | 47 |
| 30 min  | 49 | 51 |
| 45 min  | 53 | 54 |
| 1 hr    | 54 | 56 |
| 2 hrs   | 55 | 66 |
| 3 hrs   | 55 | 67 |
| 16 hrs  | 59 | 69 |

Within a few minutes after contact with the syrup, the originally hard particles become sticky and rapidly soften as they absorb more syrup.

The particles used in the above demonstration were ground from a commercial composition "I-300" of Aristech Chemical Corporation. The particles contain approximately 20% uncrosslinked polymer from the original syrup from which it was made. This uncrosslinked polymer is soluble and it is relatively free to associate with the methyl methacrylate monomer of the "new" syrup as it is absorbed by the particles, and is thus available to form a continuous polymeric network with the matrix which interpenetrates the particles. The particles in our finished product are not mechanically separable and effectively become part of the continuous phase of the matrix.

For use in our invention, the particles should have about 10% to about 30% by weight uncrosslinked polymer and about 0.15% to about 0.35% cross-linking agent in the PMMA, which will result in about 70% to about 90% crosslinked PMMA. Preferably, there will be about 20% to about 25% uncrosslinked polymer. Suitable crosslinking agents are known in the art and include ethylene glycol dimethacrylate, 1,3 butylene dimethacrylate, trimethylol propane trimethacrylate, and trimethylol propane triacrylate.

The presence of the uncrosslinked polymer in the particles enhances the viscosity of the dispersion and helps to prevent the settling of particles. In addition, the relatively soluble polymer chains may migrate within or outside the particles. Then, during the following polymerization under conditions favoring sheet formation, the newly formed polymer chains become better entangled and interpenetrated with the structure of the existing polymer chains (both crosslinked and uncrosslinked) forming the particles. This provides an optimal bonding between the particles and the matrix, so that the sheets can be easily thermoformed using conventional techniques.

Following are examples of demonstrations of our invention:

EXAMPLE 1

"I-300", Aristech acrylic sheets in white and black colors, were ground to an average particle size where 90% of the acrylic particles passed through a #35 U.S. mesh screen. Equal parts of white and dark particles (105 grams total) were added to 595 grams of a solution of PMMA in MMA. Such a solution was prepared by adding 238 grams of MMA to 357 grams of a syrup. The syrup was prepared by partial polymerization of MMA and butyl acrylate monomers (97% MMA - 3% BA) to a viscosity of 3.0 poise and a polymer content of 20.0% by weight. To the solution were also added other ingredients, to obtain the proper polymerization rate and overall cure after the swelling process is completed. These ingredients were 0.46 gr. of N-dodecyl mercaptan, 1.75 gr. of Decanox F (decanoyl peroxide), 0.46 grams of tri-isooctyl phosphite and 0.011 gr. of Zelec UN (DuPont registered trademark) as release agents.

The above suspension was mixed at room temperature for 120 min. under 23 inches of vacuum. The suspension was then poured into a cell formed by two opposing 14 inches× 14 inches polished stainless steel plates, spaced to a uniform distance of 0.224 inches by PVC tubing at the perimeter. After the cell was sealed, it was immersed in hot water maintained at 180° for 50 minutes and the curing was then completed in an air circulated oven, for 30 minutes at 250° F. After cooling, the cell was disassembled, obtaining a glossy, smooth, void-free acrylic sheet of 0.187 inches thickness, with a granite-like appearance.

EXAMPLE 2

Aristech "I-300" acrylic sheets of three different colors (stormy grey, jersey cream, desert sand) were ground and equal amounts of each one were added to a mixture of MMA and PMMA as described in Example 1.

The suspension was heated to 180° F. for 30 minutes and the volume of acrylic particles grew to about 2.5 times the original volume. The suspension was cooled to room temperature and added with the same amount and type of chemical ingredients listed in Example 1. The suspension was then left under agitation and vacuum and the curing process was completed as described in Example 1.

When the cell was disassembled, a smooth, glossy surface, void-free acrylic sheet with a natural stone-like appearance was obtained. While the particles were visually identifiable, they appeared to be interpenetrated by and integral with the matrix.

Thermoforming

The sheets obtained in Examples 1 and 2 were trimmed at the edges to 12"×12", placed in the clamp frame of a laboratory scale thermoformer with quartz tube heaters and heated to 380° F. The heated sheet was positioned over a 7.5 inches square female mold and vacuum formed to a depth of 4 inches. After the parts were cooled and removed from the thermoformer, their surface had a textured yet glossy and pleasant appearance. The degree of surface texture increased in proportion to the amount of stretch in the formed part.

EXAMPLE 3

A modified I-300 acrylic sheet was prepared, in which the amount of crosslinking agent was 50% less than in the I-300 acrylic sheets which were ground for Example 1. The ground acrylic particles were added to PMMA in MMA and permitted to swell; the matrix MMA was then polymerized into a glossy, smooth, void-free acrylic, by the method described in Example 1.

EXAMPLE 4

A modified I-300 acrylic sheet was prepared, in which the amount of crosslinking agent was 50% more than in the acrylic sheets which were ground for Example 1. The ground acrylic particles were added to PMMA in MMA; after they swelled, the matrix was polymerized into a glossy, smooth, void-free acrylic sheet, as described in Example 1.

Thermoforming of Examples 3. and 4 Samples

The acrylic sheets produced as described in Examples 3 and 4 were thermoformed as described in Thermoforming of Examples 1 and 2, in the same mold and at the same conditions. The depth and intensity of the textured but glossy surfaces was different.

The thermoformed sample from Example 3 had the least noticeably textured surface, less than Examples 1, 2, and 4.

The thermoformed sample from Example 4 had the most noticeably textured surface, more than Examples 1, 2, and 3.

The degree of textured appearance of Examples 1 and 2 is intermediate between those of Examples 3 and 4.

The degree of textured appearance within the same thermoformed sample changes depending on the amount of stretch of the sheet; that is, the texture was more pronounced (deeper depressions) where the sheet was stretched the most.

All the above textured or roughened surfaces were attractive and had friction increasing effects. Large sheets may be used to thermoform into tub-shower enclosures, contoured kitchen and bathroom fixtures, and the like.

I claim:

1. A method of making an acrylic product having a textured surface, comprising the steps of:
   (a) mixing (i) a syrup comprising about 80 to about 95 percent by weight of methylmethacrylate and about 5 to about 20 percent by weight of polymethylmethacrylate and (ii) about 5 to about 25 percent based on the weight of said syrup of polymethylmethacrylate particles, said polymethylmethacrylate particles comprising up to 1 percent by weight of a crosslinking agent and about 10 to about 30 percent by weight of uncrosslinked polymethylmethacrylate;
   (b) permitting said particles to absorb methylmethacrylate whereby said particles swell to about 200 percent or more of their original volume; and
   (c) curing said syrup containing said particles, whereby said resulting acrylic product is thermoformable.

2. The method of claim 1 further comprising the step of adding an inert inorganic filler to said syrup before curing.

3. The method of claim 2 wherein said inorganic filler is alumina trihydrate.

4. The method of claim 3 wherein said alumina trihydrate is present in an amount of about 10 to about 55 percent by weight of the finished product.

5. The method of claim 1 wherein the polymethylmethacrylate in said particles which is not crosslinked is about 20 to about 25 percent by weight of said polymethylmethacrylate.

6. The method of claim 1 wherein said particles are of a size such that no more than about 1% are retained on a sieve having openings of 0.5 mm.

7. The method of claim 1 wherein the polymethylmethacrylate of said syrup has a weight average molecular weight of about 150,000 to about 600,000.

8. The method of claim 1 wherein said syrup further comprises butyl acrylate.

* * * * *